Oct. 25, 1949.                J. P. TRIULZI                2,486,345
                              BARBECUE SPIT
                           Filed April 22, 1946

*INVENTOR.*
JOSEPH P. TRIULZI
BY Mason & Graham
ATTORNEYS

Patented Oct. 25, 1949

2,486,345

UNITED STATES PATENT OFFICE 2,486,345

BARBECUE SPIT

Joseph P. Triulzi, Los Angeles, Calif.

Application April 22, 1946, Serial No. 663,933

6 Claims. (Cl. 99—421)

1

The present invention relates to a barbecue spit, and has reference more particularly to a motorized barbecue spit which can be used with any suitable barbecue fireplace.

In recent years the practice of preparing meals over an open fire has gained considerably in popularity, and large numbers of people have barbecue grills or stands either of the permanently built type of stone or brick, or those which comprise a small metal or fireclay container on a portable stand in which it is possible to build a fire of charcoal or other suitable fuel, and to roast meat and other food items over the open fire.

Barbecuing devices having motorized spits are not new, but since many of those who enjoy barbecuing meals already are provided with some form of grill or fireplace for providing the necessary fire, the market for barbecue grills having motorized spits is somewhat limited. Furthermore, such devices are usually installed outdoors, and it is impractical to protect the spit rotating mechanism between uses. The use of such motorized spit equipment, therefore, has been limited mostly to restaurants and barbecue stands which practice this type of cooking on a professional basis.

An object of the present invention is to make an improved and simplified barbecue spit.

Another object of the invention is to make an easily transportable device for holding and turning meat for barbecuing which can be used with most available types of barbecue fireplaces whether of permanently built or portable type.

Another object is to make an improved motorized barbecue spit which may be adjusted readily for mounting food for barbecuing in suitable positions for cooking over different sizes and types of barbecue fireplace equipment.

Another object is to make a simple, easily transportable food support for barbecuing which is supported independently of a barbecue fireplace and which may be readily adjusted angularly as well as horizontally and vertically for proper positioning of the food with respect to a fireplace with which the device may be used.

These and other features of the invention will be more fully set forth further in the following description and the accompanying drawings, which illustrate a preferred embodiment of the invention.

In the drawings, which comprise one sheet:

Figure 1:
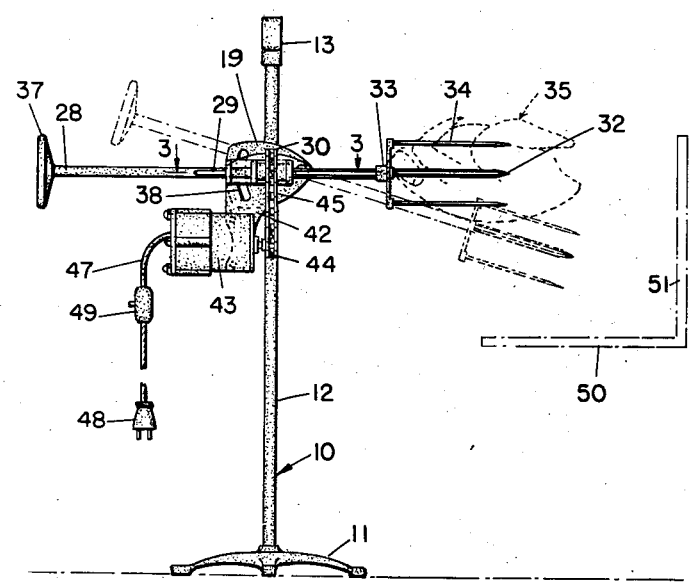
Fig. 1 is a view in side elevation of a device embodying the present invention in position for use, the spit being illustrated in downwardly tilted position in dotted lines, and alternate positions of a fireplace grill being indicated in dotted lines.
Figure 2:
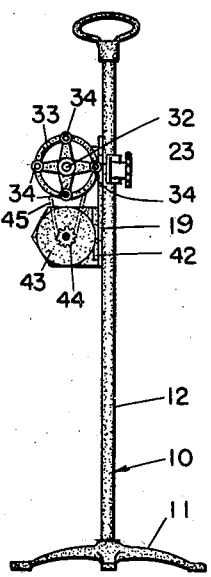
Fig. 2 is an end elevational view of the device illustrated in Fig. 1.

Referring to the drawings in detail, a stand 10 has a tripod base portion 11 with an upright tubular portion 12 rigidly mounted thereon. A looped carrying handle 13 may be threaded onto the upper end of the tube 12.

Figure 3:
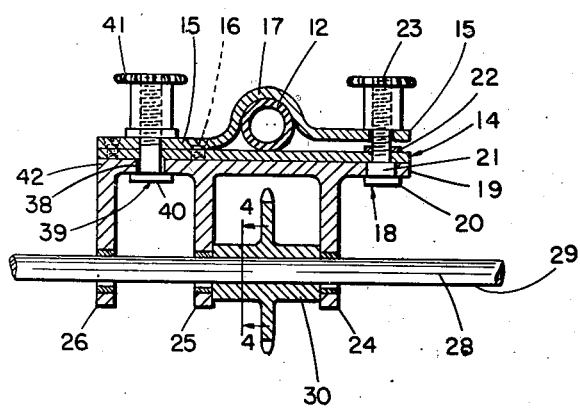
Fig. 3 is an enlarged fragmentary sectional view taken on line 3—3 of Fig. 1.
Figure 4:
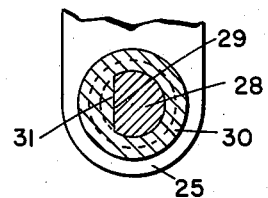
Fig. 4 is a further enlarged fragmentary sectional view taken on line 4—4 of Fig. 3.

An adjustable support plate 14 has a clamping plate 15 secured thereto, as by screws 16. The clamping plate 15 has a curved portion 17 which is adapted to pass around the tubular post 12, as illustrated in Fig. 3, and normally has a sliding fit around the post 12 so that the assembled plates 14 and 15 may be moved slidably axially of the post 12.

A combined pivot post and clamping screw 18 passes through aligned openings in the plates 14 and 15, and through a larger opening in a bracket member 19. The screw 18 has an enlarged head portion 20 which retains the bracket 19 in position thereon, and has an intermediate pivot post portion 21, the length of which is slightly greater than the thickness of the bracket member 19 at this point.

The axially aligned holes in the plates 14 and 15 to receive the screw 18 are slightly less in diameter than the opening in the bracket member 19. The bracket member 19 therefore remains free for pivotal movement on the pivot post portion 21 when the screw 18 is drawn into securing engagement with the plate 14 by a nut 22 which is threaded onto the screw 18.

A hand screw 23 is threaded onto the outer threaded end of the screw 18 whereby the plate 14 and the offset portion 17 of the plate 15 can be drawn toward each other into clamping engagement with the upright tubular stand member 12.

The bracket 19, which may be of cast aluminum, is provided with three bearing bracket extensions 24, 25, 26, which project laterally at right angles from the bracket member 19. A spit shaft 28 is pivotally mounted in aligned bearing openings in the outer ends of the bearing extensions 24, 25 and 26, the shaft 28 having a flattened side portion 29 extending from one end thereof throughout a portion of its length. The length of the flattened portion 29 is determined in a manner to be described later herein.

A sprocket wheel 30 has a flat sided central opening 31 therein adapted slidably to receive the shaft 28 for driving engagement therewith. The sprocket wheel 30 is mounted between the bracket extensions 24 and 25, as best shown in Fig. 3. One end of the shaft 28 is pointed, as at 32, and a spider 33 may be secured to the shaft a desired distance inwardly from the pointed end 32 of the spit shaft 28. The spider 33 has a plurality of relatively small pointed rods 34 mounted thereon to be parallel to the axis of the spit shaft 28 when the spider is mounted thereon, to provide a suitable rotative support for a fowl 35, or other food which it is desired to cook.

A hand wheel 37 is provided on the other end of the shaft 28, and it will be noted that the flattened side 29 of the shaft 28 terminates well short of the hand wheel. The point where the end of the flat portion 29 of the spit shaft 28 engages the sprocket wheel 30 limits the distance which the spit shaft 28 can be moved slidably to the right from the position illustrated in Fig. 1. The desired limit of slidable movement of the spit shaft is determined experimentally at the factory so as to insure that the center of gravity of the entire device will fall within the limits defined by the base when the device is supporting a normal sized roast or other food item. All subsequent rods of a similar model are then manufactured in conformance therewith.

The plate portion of the bracketed member 19 has an arcuate slot 38 therein (see Fig. 1), the arc of curvature of which is concentric with the screw 18. A screw 39 is mounted to lie in the slot 38, the screw 39 having an enlarged head portion 40 which overlies the sides of the arcuate slot 38, the screw being mounted in aligned openings in the plates 14 and 15. A handscrew 41 is threaded onto a threaded projecting portion of the screw 39 whereby the bracketed member 19 may be clamped in angularly adjusted position.

The bracket member 19 has a downwardly extending motor support portion 42 on which an electric drive motor 43 having integral reduction drive gearing is mounted. The motor 43 is arranged to drive a sprocket wheel 44 which in turn has driving connection with the shaft-rotating sprocket 30 through a drive chain 45. The speed reduction ratio of the motor preferably is such as to cause the spit shaft 28 to rotate somewhere in the speed range of one of two revolutions per minute.

A suitable electrical conductor cord 47 is provided with a plug 48 by means of which the motor can be connected to a suitable source of electric current, and a switch 49 may be provided in the cord for convenience in operation. Where no electrical current is available a spring wound motor, not shown, may be substituted for the electrical motor illustrated.

In using the device, a fire is built in any suitable barbecue fireplace, or on the ground if desired. One such fire location is indicated by the dotted lines 50 in Fig. 1, although it is apparent that this could be at a substantially greater or lower height and still be readily accessible with the device of the present invention. Some barbecue cooks prefer a vertically disposed fire, and such an arrangement is indicated by the dotted line 51 in Fig. 1.

After the height and type of fire is determined, the entire bracket assembly may be adjusted vertically on the tubular post 12 by loosening the hand screw 23 which releases the plates 14 and 15 from clamping engagement with the post 12 and permits free vertical adjustment of the entire bracket assembly. The bracket assembly may be clamped in vertically adjusted position on the post 12 by tightening the hand screw 23.

Angular adjustment of the shaft 28 is accomplished by loosening the hand screw 41 which permits pivotal adjustment of the bracket member 19 about the screw 18 within the limits of movement as determined by the length of the arcuate slot 38. The limits of angular adjustment of the bracket member 19 are retained within the limiting angle of friction of the shaft 28 in its bearings so as to avoid free sliding movement of the shaft under its own weight.

Endwise slidable movement of the spit shaft 28 in the bearing extensions 24, 25 and 26 within the limits determined by the length of the flattened shaft portion 29 and the position of the spider 33 may be accomplished by endwise manipulation of the shaft, for example, by pushing or pulling on the hand wheel 37 as required.

In case the device should be required for use at a point remote from a suitable source of electric power, the spit can be detached from driven connection with the motor as by removing the drive chain 45, or by removing the sprocket 30 endwise from the spit shaft 29. When the spit is released from driven connection with the motor 43 the spit can be rotated manually by means of the hand wheel 37.

While I have illustrated and described a preferred embodiment of my invention, it will be apparent that the device is capable of some modification without departing from the spirit of the invention. I do not, therefore, desire to limit the invention except as defined in the following claims.

I claim:

1. A motorized barbecue device comprising a stand, a bracket mounted on said stand for vertical adjustment thereon, a food supporting spit shaft journalled in said bracket and extending laterally therefrom, said spit shaft being axially slidable in said bracket, means for supporting a food article on a laterally projecting end portion of said spit, a drive motor mounted on said bracket, and speed reducing drive means operatively connecting said motor to said shaft, said drive means including an axially fixed sprocket having slidable driving connection with said spit shaft.

2. A motorized barbecue device comprising a stand, a bracket mounted on said stand for vertical adjustment thereon, a food supporting spit shaft having a flattened side portion of limited length thereon, said shaft being journalled in said bracket and extending laterally therefrom, means for supporting a food article on a laterally projecting end portion of said spit, angular adjustment means between said stand and said bracket, a drive motor mounted on said bracket, and speed reducing drive means operatively connecting said motor to said shaft, said drive means including a drive sprocket having an axial opening substantially conforming to a flat sided portion of said spit shaft for slidable driving connection therewith.

3. A barbecue device comprising a base, a vertical stand mounted on said base, a carrying handle on said device, a clamp member mounted on said stand, clamp means associated with said clamp member and having releasable clamping engagement with said stand, a shaft supporting bracket mounted for pivotal movement on said clamp member, means releasably securing said shaft supporting bracket in pivotally adjusted position on said clamp member, a spit shaft journalled in said shaft supporting bracket to be free for limited axial movement therein, a main food piercing spit element on an end portion of said shaft, a plurality of axially parallel food piercing elements mounted on said shaft laterally adjacent said main food piercing spit element, a drive motor mounted on said shaft supporting bracket, and speed reducing drive means interconnecting said motor and said shaft, said drive means having axially movable driving engagement with said shaft.

4. A barbecue device comprising a base, a vertical stand mounted on said base, a carrying handle on said stand, a clamp member slidably mounted on said stand, clamp means associated with said clamp member and having releasable clamping engagement with said stand, a shaft supporting bracket mounted for limited pivotal movement on said clamp member, means releasably securing said shaft supporting bracket in pivotally adjusted position on said clamp member, a shaft journalled in said shaft supporting bracket to be free for limited endwise slidable movement therein, a food piercing spit element carried by an end portion of said shaft, the endwise movement of said shaft being limited to maintain the specific gravity of said device within the limits defined by said base with a predetermined weight supported on the food piercing spit element, a drive motor mounted on said shaft supporting bracket, and speed reducing drive means interconnecting said motor and said shaft, said shaft being free for limited slidable movement in said drive means.

5. In a motorized barbecue device, a stand, a bracket mounted on said stand for vertical adjustment thereon, a food supporting spit shaft journalled in said bracket and extending laterally therefrom, said spit shaft being axially slidable in said bracket, means for supporting a food article on a laterally projecting end portion of said spit, a drive motor mounted on said bracket, and drive means operatively connecting said motor and said shaft, said drive means including a member having axially slidable positive rotative driving connection with said shaft.

6. A barbecue device comprising a base, a vertical stand mounted on said base, a shaft supporting bracket mounted on said stand, a shaft journalled in said shaft supporting bracket to be free for limited endwise slidable movement therein, a food piercing spit element carried by an end portion of said shaft, the endwise movement of said shaft being limited to maintain the specific gravity of said device within the limits defined by said base with a predetermined weight supported on the food piercing spit element, a drive motor mounted on said bracket, and drive means operatively connecting said motor and shaft, said shaft being free for limited slidable movement in said drive means.

JOSEPH P. TRIULZI.

REFERENCES CITED

The following references are of record in the file of this patent:

UNITED STATES PATENTS

| Number | Name | Date |
| --- | --- | --- |
| 1,384,250 | Froom | July 12, 1921 |
| 2,059,666 | Thompson | Nov. 3, 1936 |

FOREIGN PATENTS

| Number | Country | Date |
| --- | --- | --- |
| 155,715 | Great Britain | Dec. 30, 1920 |